(12) United States Patent
Op't Roodt et al.

(10) Patent No.: US 7,581,280 B2
(45) Date of Patent: Sep. 1, 2009

(54) WIPING DEVICE FOR WINDOWS OF MOTOR VEHICLES

(75) Inventors: Inigo Op't Roodt, Hasselt (BE); David Van Baelen, Herent (BE)

(73) Assignee: Robert Bosch GmbH (DE)

( * ) Notice: Subject to any disclaimer, the term of this patent is extended or adjusted under 35 U.S.C. 154(b) by 765 days.

(21) Appl. No.: 10/538,948

(22) PCT Filed: Oct. 2, 2003

(86) PCT No.: PCT/DE03/03276

§ 371 (c)(1),
(2), (4) Date: Jun. 14, 2005

(87) PCT Pub. No.: WO2004/056623

PCT Pub. Date: Jul. 8, 2004

(65) Prior Publication Data

US 2006/0112511 A1 Jun. 1, 2006

(30) Foreign Application Priority Data

Dec. 19, 2002 (DE) ................................ 102 59 478

(51) Int. Cl.
*B60S 1/38* (2006.01)
(52) U.S. Cl. ............................. 15/250.43; 15/250.452; 15/250.453; 15/250.201
(58) Field of Classification Search ............ 15/250.451, 15/250.452, 250.453, 250.454, 250.43, 250.44, 15/250.201, 250.361
See application file for complete search history.

(56) References Cited

U.S. PATENT DOCUMENTS 3,116,507 A * 1/1964 Scinta ................... 15/250.451
3,626,544 A   12/1971 Lopez et al.
5,493,750 A * 2/1996 Bollen et al. ............ 15/250.452
5,933,910 A    8/1999 Buechele et al.
2002/0148063 A1* 10/2002 De Block et al. ......... 15/250.43
2002/0148064 A1  10/2002 Mazurkiewicz et al.

FOREIGN PATENT DOCUMENTS

| DE | 91 16 994   | 2/1995  |
|----|-------------|---------|
| DE | 296 11 722  | 11/1997 |
| DE | 199 51 363  | 5/2001  |
| DE | 100 25 710  | 8/2001  |
| DE | 100 54 235  | 5/2002  |
| JP | 62192093 A  | 8/1987  |
| JP | 6229331 A   | 8/1994  |
| JP | 10 24806    | 1/1998  |
| JP | 2995613 B2  | 12/1999 |
| JP | 2000071944 A| 3/2000  |

* cited by examiner

*Primary Examiner*—Gary K Graham
(74) *Attorney, Agent, or Firm*—Michael Best & Friedrich LLP

(57) ABSTRACT

The invention relates to a wiper device for windows of motor vehicles, comprised of a non-articulated wiper blade with a wiper strip, a wiper lip arranged thereon and a coupling part that can be connected to the wiper blade for a detachable connection with a swivelable wiper arm of the vehicle, wherein the wiper strip includes a profile with guide grooves to laterally accommodate two spring rails, which are each connected with one another as a single piece on their two ends. It is provided that the wiper strip (16) feature a locking device, which, in a locked setting, fixes the spring rails (20) in the wiper strip (16), and which, in an unlocked setting, enables a longitudinal displacement of the spring rails (20) in the guide grooves (24) of the wiper strip (16).

16 Claims, 12 Drawing Sheets

WIPING DEVICE FOR WINDOWS OF MOTOR VEHICLES

BACKGROUND OF THE INVENTION

The invention concerns a wiper device for windows of motor vehicles.

Non-articulated wiper blades for windows of motor vehicles are known. Such a wiper blade is typically composed of a wiper strip, which is reinforced by means of one or two spring rails and which features a wiper lip that can be applied to the window. The curvature and the spring characteristics of the spring rails reinforcing the wiper strip substantially determine the adaptability of the wiper lip to the curvature of the windshield and thus the wiping properties of the wiper blade. The wiper blade is detachably fixed approximately in the center on a swivelable wiper arm of the motor vehicle by means of an adapter or a coupling part.

In the case of a known variation of such a one-piece, non-articulated wiper blade, a wiper strip is provided with two laterally attached spring rails, which are connected to one another as a single piece on their two ends by means of transverse connecting pieces. These types of one-piece wiper blades are described in DE 296 11 722 U1 and in DE 100 25 710 A1. Characteristic in this case is the non-detachable connection of the two spring rails with the wiper strip.

SUMMARY OF THE INVENTION

A wiper device for windows of motor vehicles in accordance with the present invention is comprised of a non-articulated wiper blade with a wiper strip, a wiper lip arranged thereon and a coupling part that can be connected to the wiper blade for a detachable connection with a swivelable wiper arm of the vehicle. The wiper strip features a profile with guide grooves to laterally accommodate two spring rails, which are each connected to one another on their two ends. The invention provides for the wiper strip to feature a locking device, which, in a locked setting, fixes the spring rails in the wiper strip, and which, in an unlocked setting, enables a longitudinal displacement of the spring rails in the guide grooves of the wiper strip.

By actuating the locking device, the wiper blade made of rubber or another suitable flexible material can thereby be separated from the spring rails and in the case of wear be replaced separately. With conventional, non-articulated wiper blades, this type of separation is not possible, however, since the spring rails are permanently connected with the wiper blade and cannot be separated from them in a non-destructive manner. In contrast, the invention enables only the used components of the wiper device to be replaced, thereby saving resources.

One embodiment of the invention provides that the locking device include a fastening clip that can be fixed on an upper side of the wiper strip, which clip cooperates in a detachable locking connection with a connecting bridge that connects the spring rails. The fastening clip can preferably be connected to the base strip by means of shackles engaging in the guide grooves and at least one pointed hook that can be pressed into the upper side of a base section. As a result, in a locked setting, the flat fastening clip partially grips under the connecting bridge, wherein it is locked against the connecting bridge by means of limit stop hooks and a spring tongue. The lock can preferably be detached by pressing the elastically deformable spring tongue against the upper side of the base section of the wiper strip.

As is the case with conventional, non-articulated wiper blades, the spring rails are each connected to one another as a single piece on their ends, in the case at hand by means of a connecting bridge. In this manner it is assured that the spring rails cannot be moved apart and are thereby at all times laterally, solidly fixed in the profile of the wiper strip. In accordance with the present invention, however, the wiper strip can be displaced in the longitudinal direction against the spring rails when the lock of the fastening clip with the connecting bridge is detached.

The lock is composed of limit stop hooks of the fastening clip, which are adjacent to an edge of the connecting bridge. Adjacent on its opposing edge in a locked state is the flexible spring tongue, which can be shifted away from the edge by pressing down on the wiper strip. As a result, in the case of a longitudinal displacement of the wiper strip against the spring rails, the fastening clip can dip through under the connecting bridge and the wiper strip can be completely separated from the spring rails in a displacement motion in the longitudinal direction. In doing so, they slide in a first guide groove on both sides of the wiper strip.

One embodiment of the invention provides that the lock can be detached by actuating a securing bow that is positioned in a cap located at the end of the wiper blade. The cap features an elastically deformable locking tooth cooperating with the spring tongue, which actuates the spring tongue when the cap is pulled off. Moreover, the locking tooth makes sure that the cap can only be pulled off via a certain exertion of force and cannot get lost during normal operation of the wiper device. If the cap does nevertheless get lost, the lock is not automatically thereby detached, but can be manually detached if need be.

In the case of this embodiment, actuating the locking device takes place by removing the cap from the wiper blade.

An alternative embodiment provides that the lock can be detached by actuating a securing bow that is positioned in a cap located at the end of the wiper blade. In this case, the cap features a slightly modified form and function and also remains on the wiper blade when unlocked. For this purpose, the cap is fixed on the connecting bridge by means of at least one essentially rigid locking tooth. The spring tongue in this embodiment in accordance with the invention can be actuated when swiveling the securing bow via an unlocking bow located on the securing bow. As a result, a defined unlocking of the fastening clip is possible.

In addition, both alternative embodiments can provide that the cap feature two slide rails each of which engage in the guide grooves of the wiper strip. To guarantee the function mentioned, only one locking device as well as one cap on one end of the wiper blade are required. For optical reasons, however, a cap of the same kind can also be attached on the other end of the wiper blade, which has no function, however.

Additional advantageous embodiments of the invention are yielded in the remaining features cited in the dependent claims.

BRIEF DESCRIPTION OF THE DRAWINGS

The invention is explained in greater detail in the following in preferred exemplary embodiments on the basis of the associated drawings. They show.

DETAILED DESCRIPTION

Figure 1:
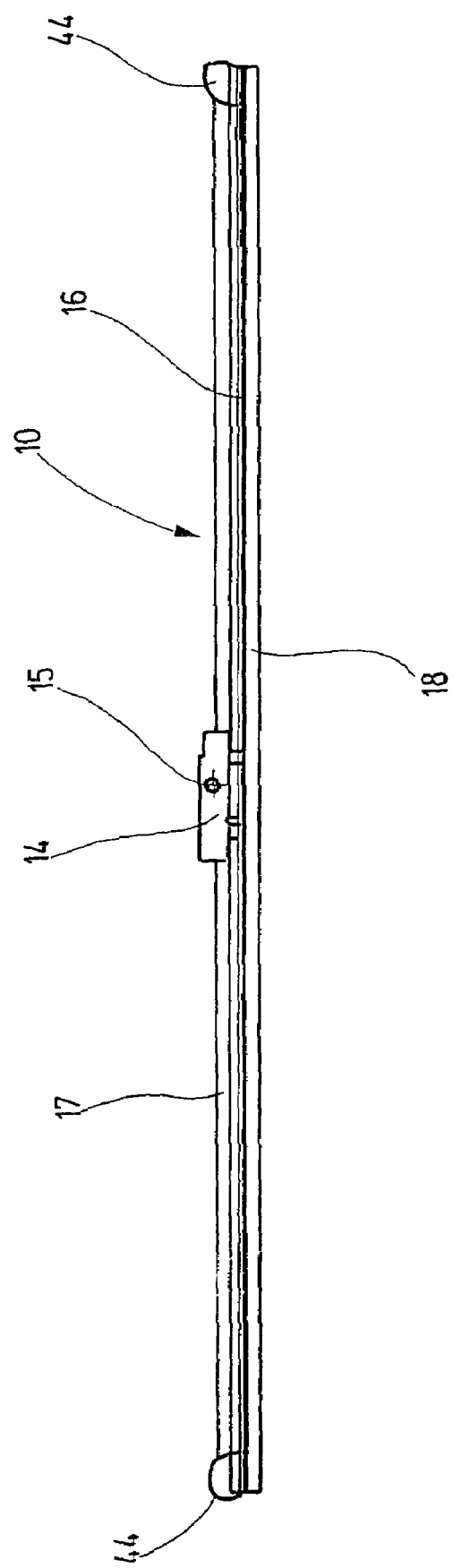
FIG. 1 A schematic side view of a wiper device in accordance with the invention.

A wiper device 10 in accordance with the invention includes a wiper blade 12, which is comprised of a wiper strip 16 and a wiper lip 18 that is embodied as a single piece with this wiper strip (see FIG. 1). The wiper lip 18 is used to clean a window of a motor vehicle. A coupling part 14 is attached approximately in the center on the wiper blade 12 and is used for a detachable connection with a swivelable wiper arm (not shown). To do this, the coupling part 14 features an articulated bolt 15, whose longitudinal axis is aligned perpendicular to the direction of the longitudinal extension of the wiper blade 12. The wiper blade 12 features a cap 44 on at least one end whose function will be explained in more detail on the basis of FIGS. 7 through 13.

Figure 2:
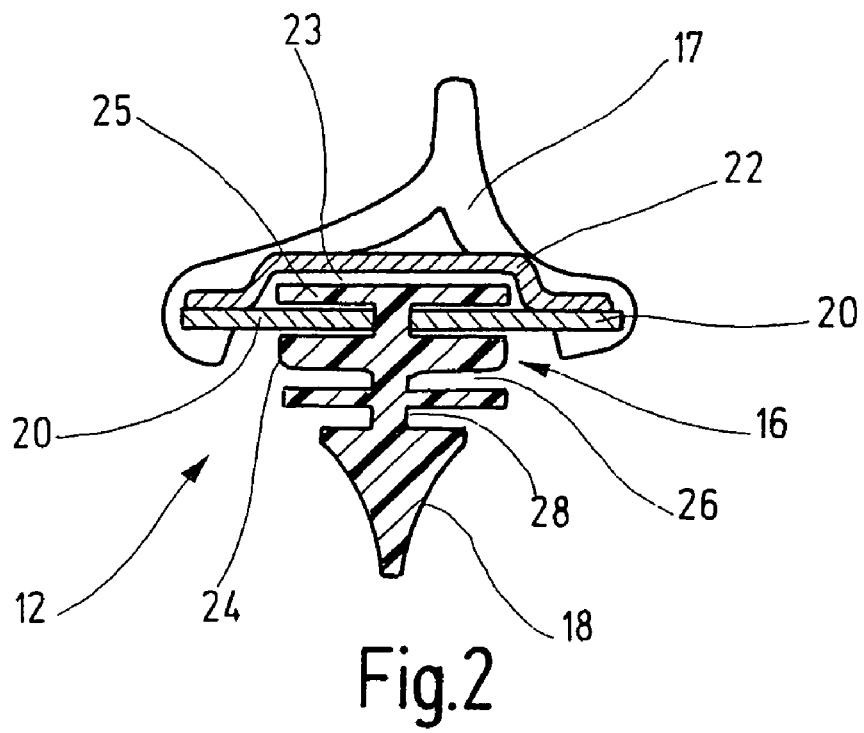
FIG. 2 A schematic top view of the wiper device in accordance with the FIG. 1.

The wiper blade 12 has a largely symmetrical profile with several guide grooves 24, 26 arranged in an opposing manner, which are arranged in the wiper strip 16 beneath a base section 25 opposing the wiper lip 18 (see FIG. 2). The first guide grooves 24 provided beneath the base section 25 are used to accommodate two spring rails 20, which are responsible for the desired form stability and elasticity of the wiper blade 12 when traveling over the window. The spring rails 20 are each comprised of a flat, band-like element, which features an approximately rectangular cross-section and which is elastically deformable largely only in a parallel direction to its narrow sides. Depending upon the application case, the spring rails 20 can already have a prescribed curvature in the unstressed state.

Figure 3:
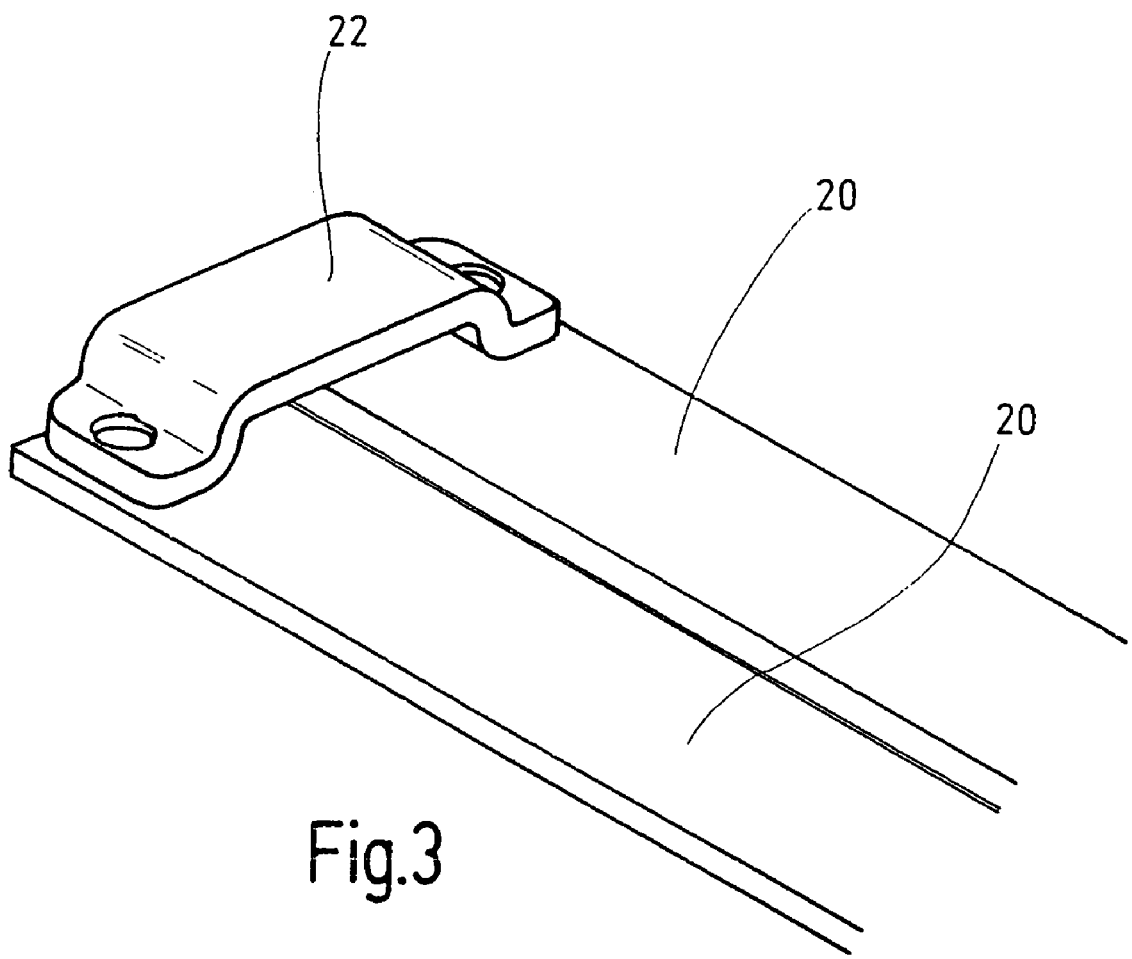
FIG. 3 A perspective detailed view of two spring rails of the wiper device that are connected with one another.

The two spring rails 20 each project out of the first guide groove 24 and are connected to one another on their ends each by means of a connecting bridge 22 (see FIG. 3). The distance of the two spring rails 20 is kept largely constant over their entire length by the two connecting bridges 22 welded on the ends. Spring rails 20 and connecting bridges 22 can be composed for example of spring steel or of an elastic plastic, which preferably has fiber reinforcement.

Figure 5:
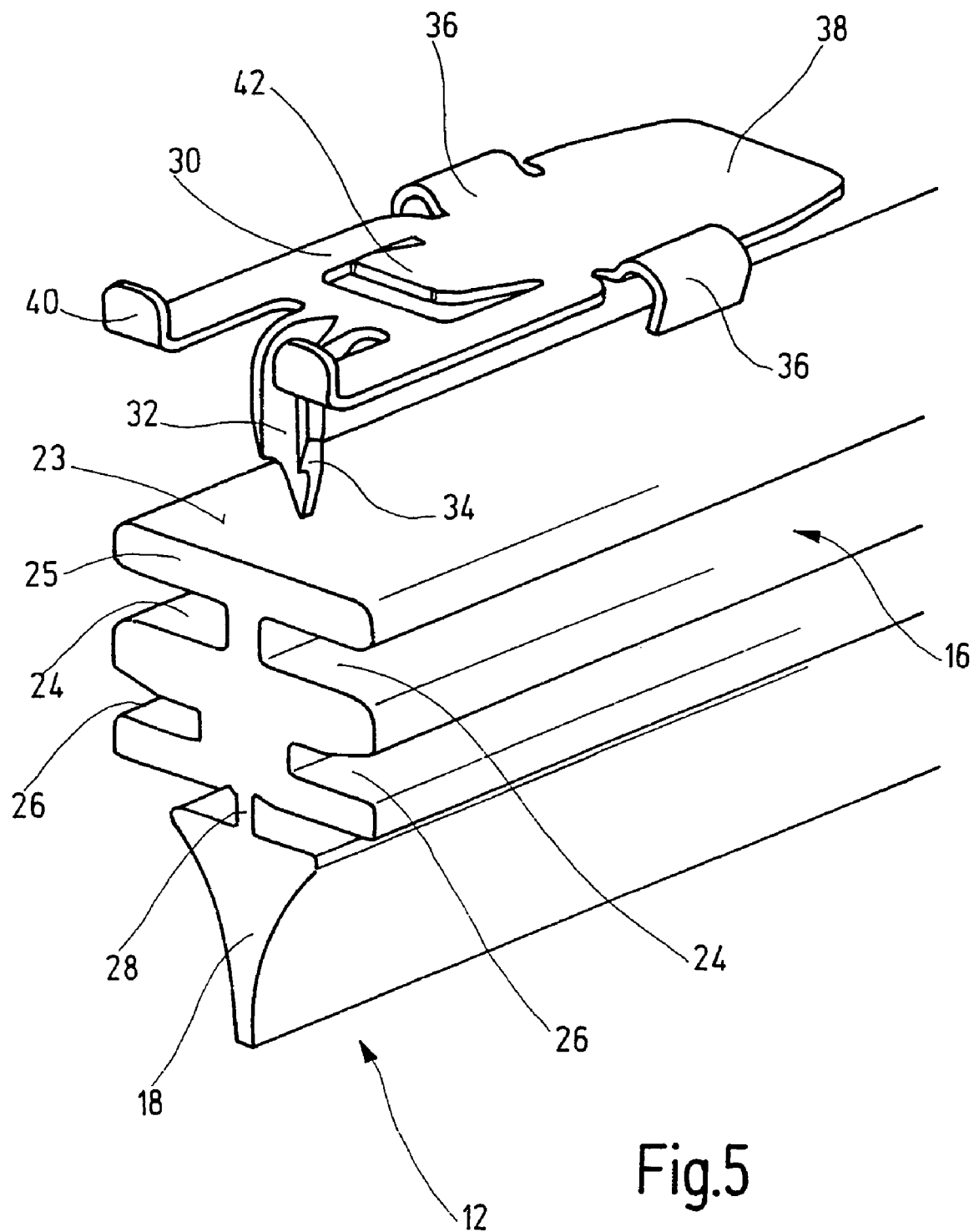
FIG. 5 A perspective detailed view of a wiper blade and a fastening clip of the wiper device that can be connected to it.
Figure 6:
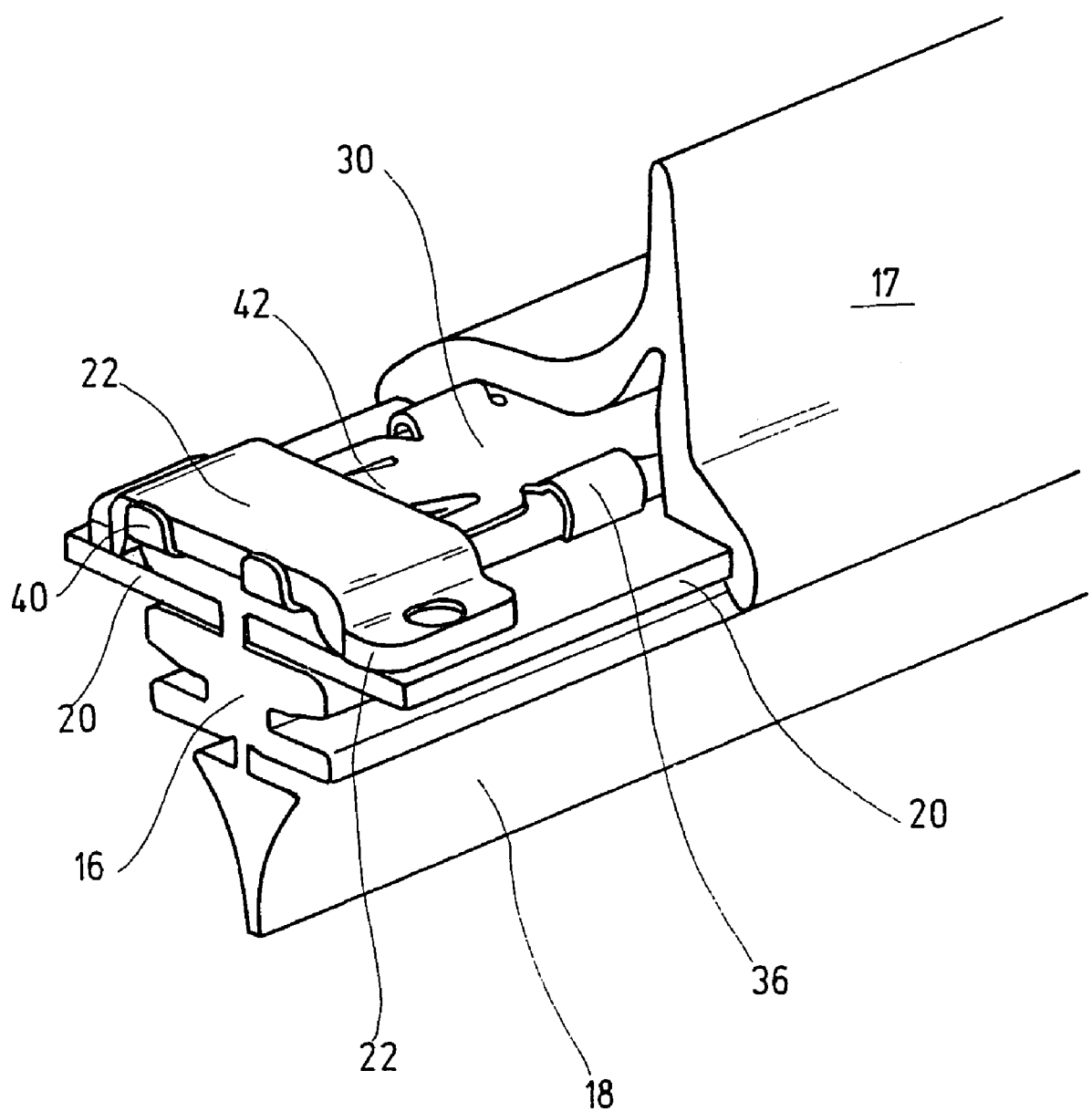
FIG. 6 A perspective detailed view of the spring rails that are connected to the wiper blade.
Figure 7:
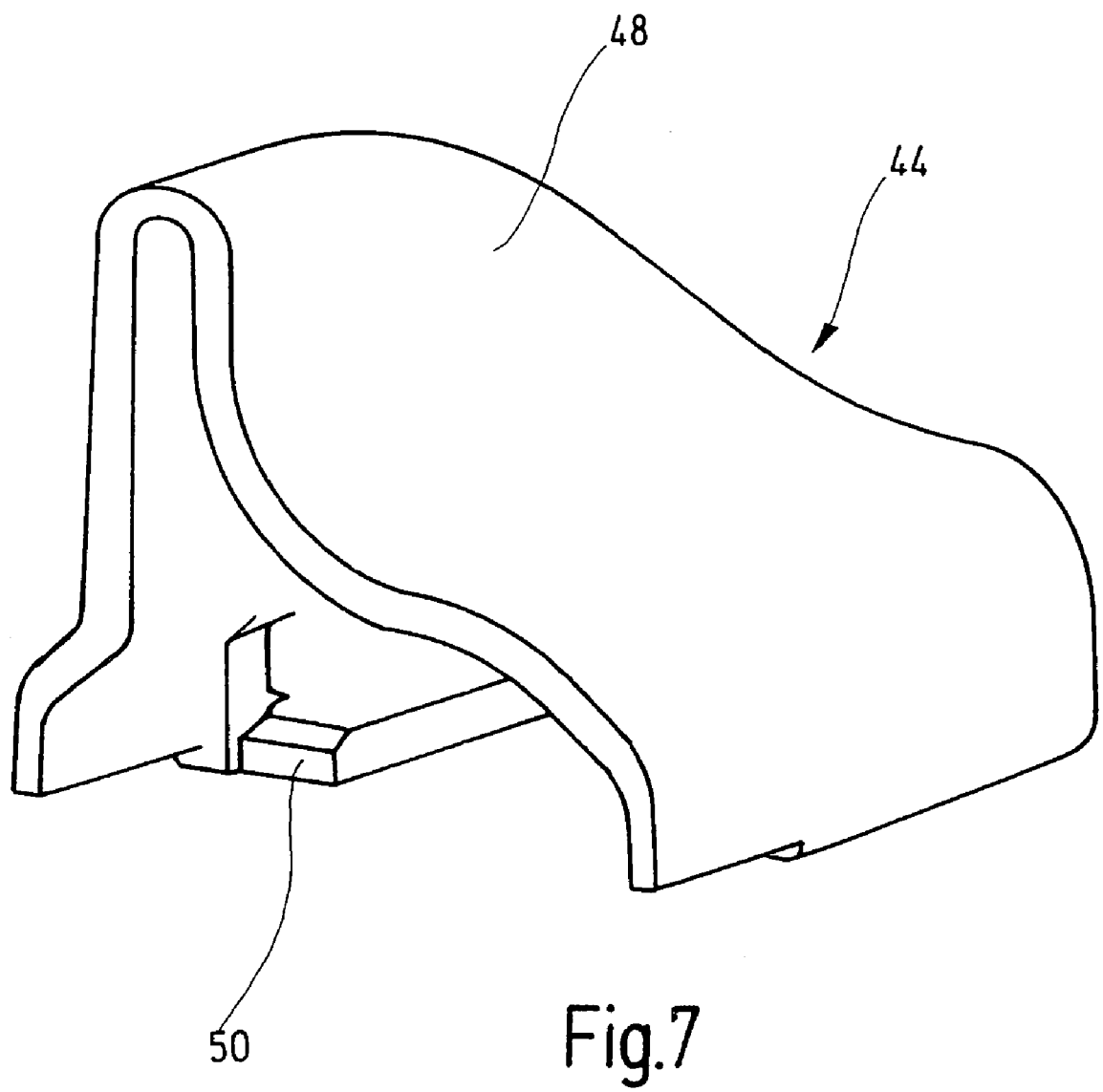
FIG. 7 A perspective representation of a first variation of a cap than can be slid over one end of the wiper blade.
Figure 8:
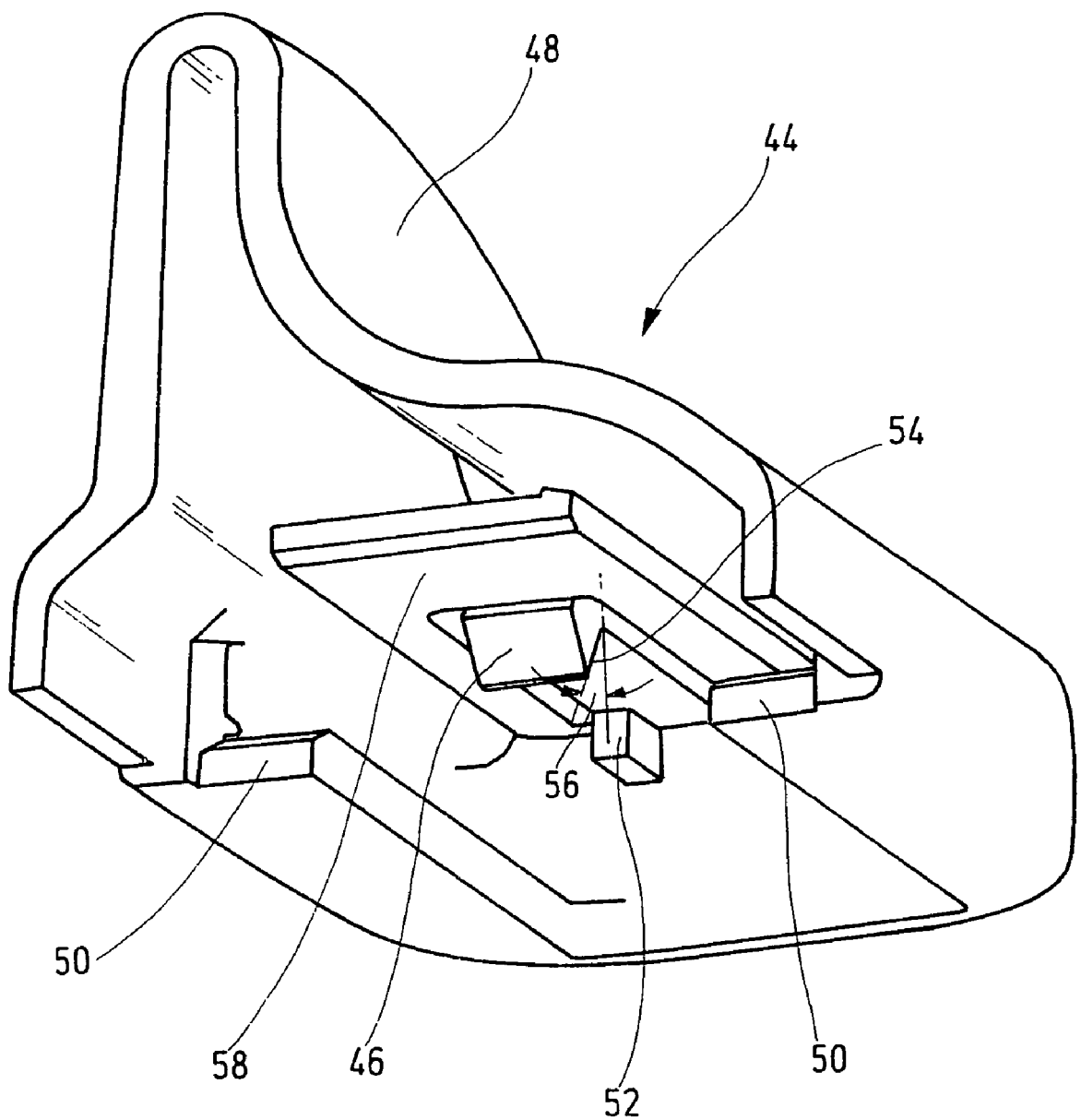
FIG. 8 Another perspective view of the cap in accordance with FIG. 7.
Figure 9:
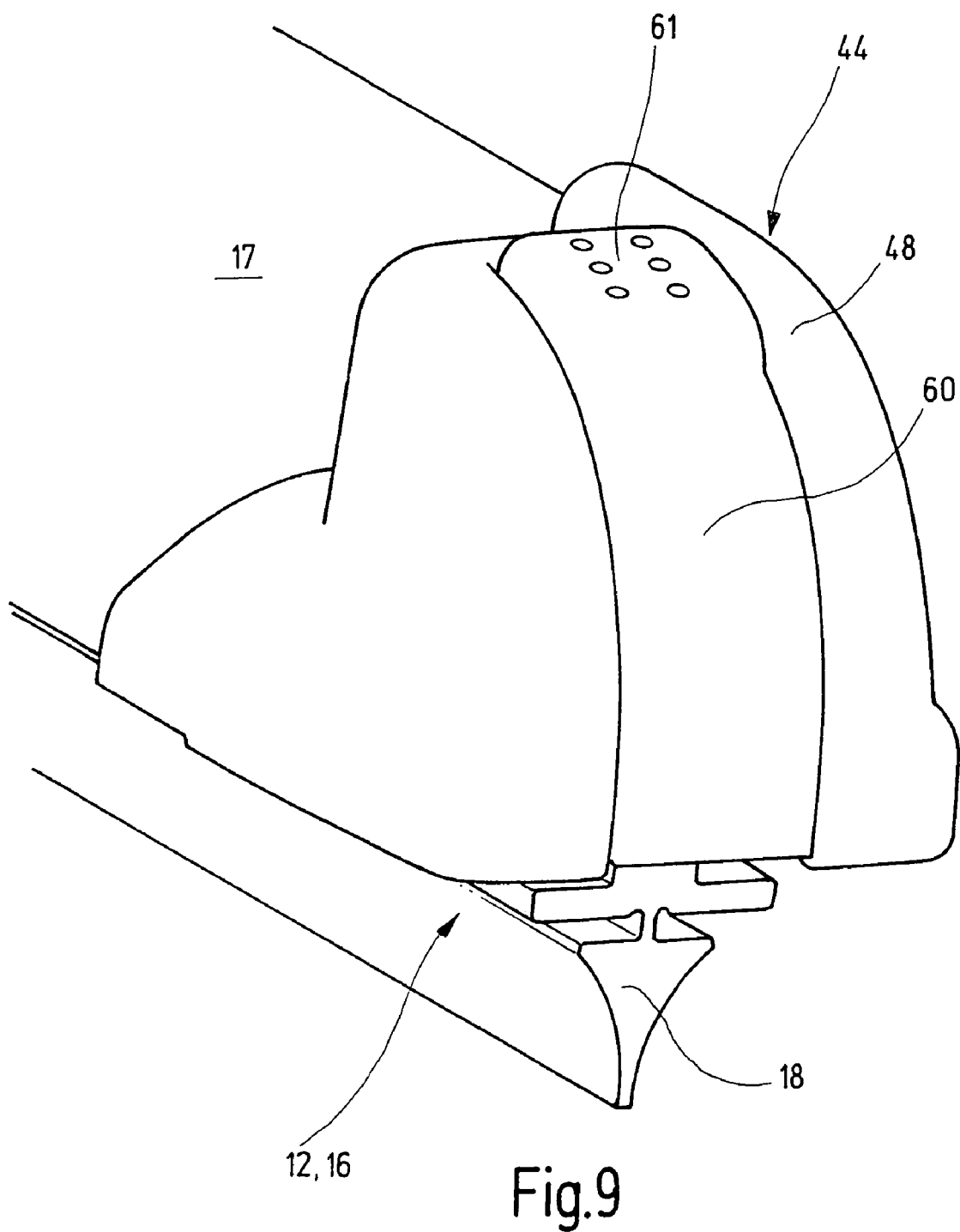
FIG. 9 An alternative variation of a cap slid over the wiper blade.

The base section 25 is situated between each of the guide rails 20 and the connecting bridge 22, wherein a small distance remains to insert a flat fastening clip 30 (see FIGS. 5 and 6).

Figure 4:
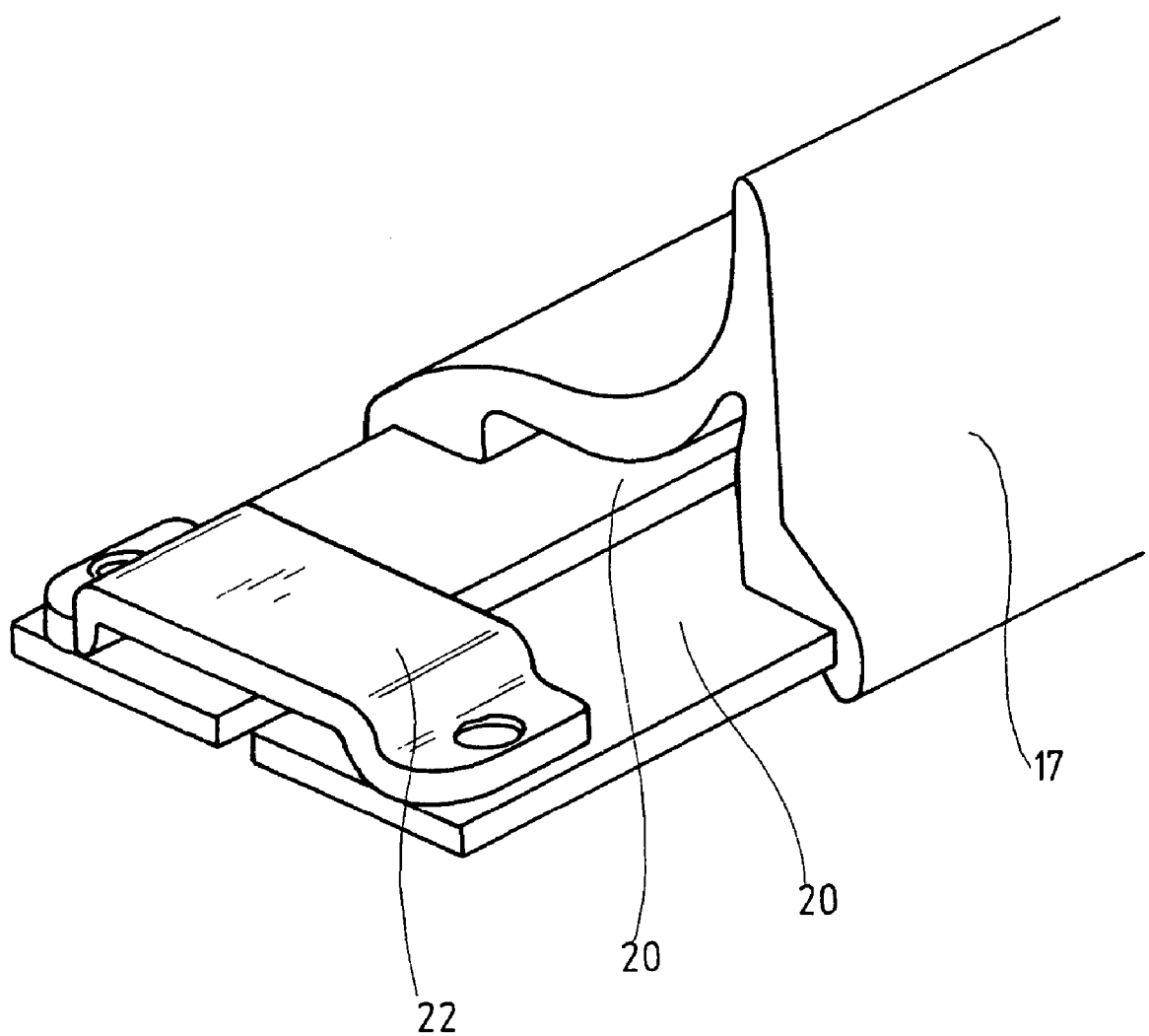
FIG. 4 Another perspective view of the spring rails that are connected by means of a connecting bridge.

Recognizable beneath the first guide grooves 24 are two guide grooves 26 in which a spoiler covering 17 can engage if necessary. In the exemplary embodiment shown in FIG. 2, this only indirectly grips around the wiper strip 16, however, and is hooked in the sections of the spring rails 20 projecting laterally from the first guide grooves 24 (see FIGS. 2, 4 and 6) so that it also remains on it when the wiper strip 16 is separated from the spring rails 20. The spoiler covering 17 is optional and can also be eliminated as an alternative.

Located on the lower end of the wiper strip 16 beneath the two guide grooves 26 is a centric articulated section 28, which represents a flexible connection to the wiper lip 18. As a result, the wiper lip 18 can execute a limited tilting motion depending upon the wiping direction of the wiper blade 12.

The fastening clip 30 can be attached on one end of the wiper strip 16, as illustrated in FIG. 5. To do so, the plate-like fastening clip 30 that is preferably composed of sheet metal or plastic features two lateral shackles 36, which can be bent laterally around the base section 25. In addition, a pointed hook 32 can be seen on one area pointing to the end of the wiper strip 16, which, when the fastening clip 30 is pressed in, penetrates perpendicularly into the upper side 23 of the base section 25 and remains there. To secure this connection, the pointed hook 32 features two barbs 34, which can hook into the rubber of the wiper strip 16. Furthermore, on the same end on either side of the pointed hook 32, are two short, perpendicular, upward-pointing limit stop hooks 40, which can provide for a detachable connection with one of the connecting bridges 22 in cooperation with a spring tongue 42 that is arranged in a center area of the fastening clip 30. The clip 30 is shaped like a spade 38 on the one end opposing the pointed hook 32 and the limit stop hook 40. This contour of the clip 30 facilitates assembly of the wiper strip 16 in that it enables insertion of the fastening clip 30 under the connecting bridge 22.

FIG. 6 illustrates a locked setting of the fastening clip 30, whose limit stop hooks 40 are adjacent to a forward edge of the connecting bridge 22 and whose unstressed spring tongue 42 is adjacent to the opposing edge of the connecting bridge 22. The wiper strip 16 provided with the fastening clip 30 is thereby solidly connected to the two spring rails 20. Because of the locking of the clip 30 against the bridge 22, any longitudinal movement of the wiper strip 16 against the spring rails 20 is prohibited. Separating these parts can only be made possible by the spring tongue 42 being pressed downward on the upper side 23 of the base section 25. In this position, the wiper strip 16 and the fastening clip 30 can be pulled out to the left under the connecting bridge 22 (in accordance with FIG. 6).

Since the spring tongue 42 is relatively difficult to access and can only be pressed downward with the aid of tools, the invention provides for an actuating device in the form of a cap 44 for easier unlocking of the clip 30. The cap 44 has two slide rails 50, which can engage in the first or second guide grooves 24, 26 or can grip around the spring rails 20. A hood 48 of the cap 44 is preferably adapted to the contour of the spoiler covering 17. A first variation of the cap 44 in accordance with FIGS. 7 and 8 features an elastically deformable locking tooth 46, which, when the cap 44 is completely pushed against the end of the wiper strip 16, lies behind the spring tongue 42 and exerts no force on it. The cap 44 in this case is pushed with one limit stop pin 52 against the wiper strip 16 or the connecting bridge 22. The locking tooth 46 is suspended elastically by means of a leaf spring and projects downward out of a cover plate 58, which can form another limit stop for the cap 44 by resting on the connecting bridge 22.

The locking tooth 46 features a ramp 54 on its rear side with a ramp angle 56 of approx. 75 degrees for example. Such a ramp angle 56 makes sure that the locking tooth 46 can slide over the connecting bridge 22 and is not blocked there when the cap 44 is pulled off. When the cap 44 is pulled off, the spring tongue 42 is actuated via the locking tooth 46 that is pressing on it so that the wiper strip 16 with the fastening clip 30 fixed on it can be separated from the spring rails 20 via a longitudinal displacement. The spring rigidity of the spring tongue 42 in this case must be less than that of the suspension of the locking tooth 46 so that this is not pressed upwards before the spring tongue 42 has been pressed under the level of the connecting bridge 22. This mechanism makes it possible to simply separate a wiper strip 16 with a used wiper lip 18 from the re-usable spring rails 20 without the entire wiper blade 12 having to be replaced.

Figure 10:
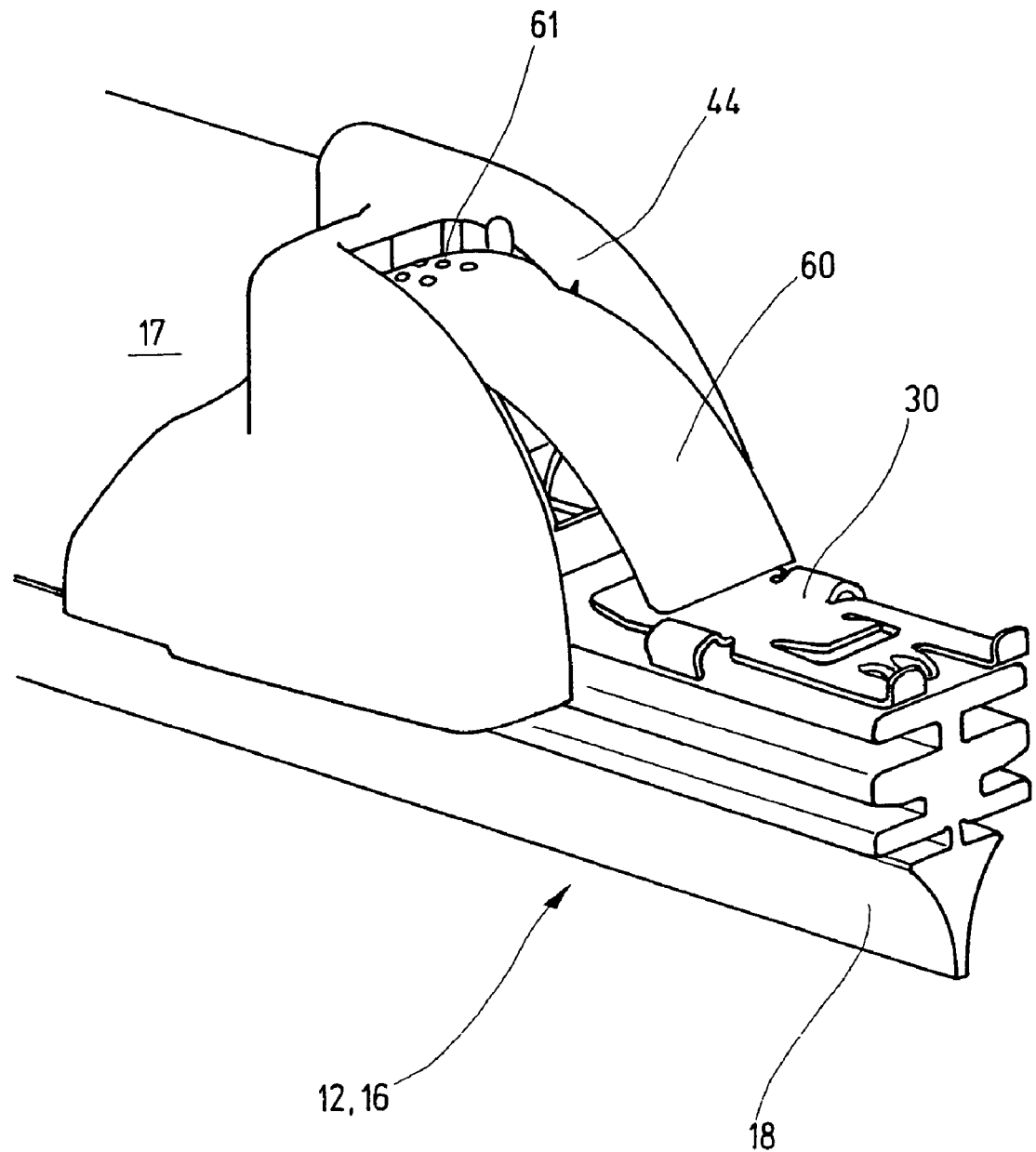
FIG. 10 A perspective partial view of a wiper strip unlocked from the spring rails.
Figure 11:
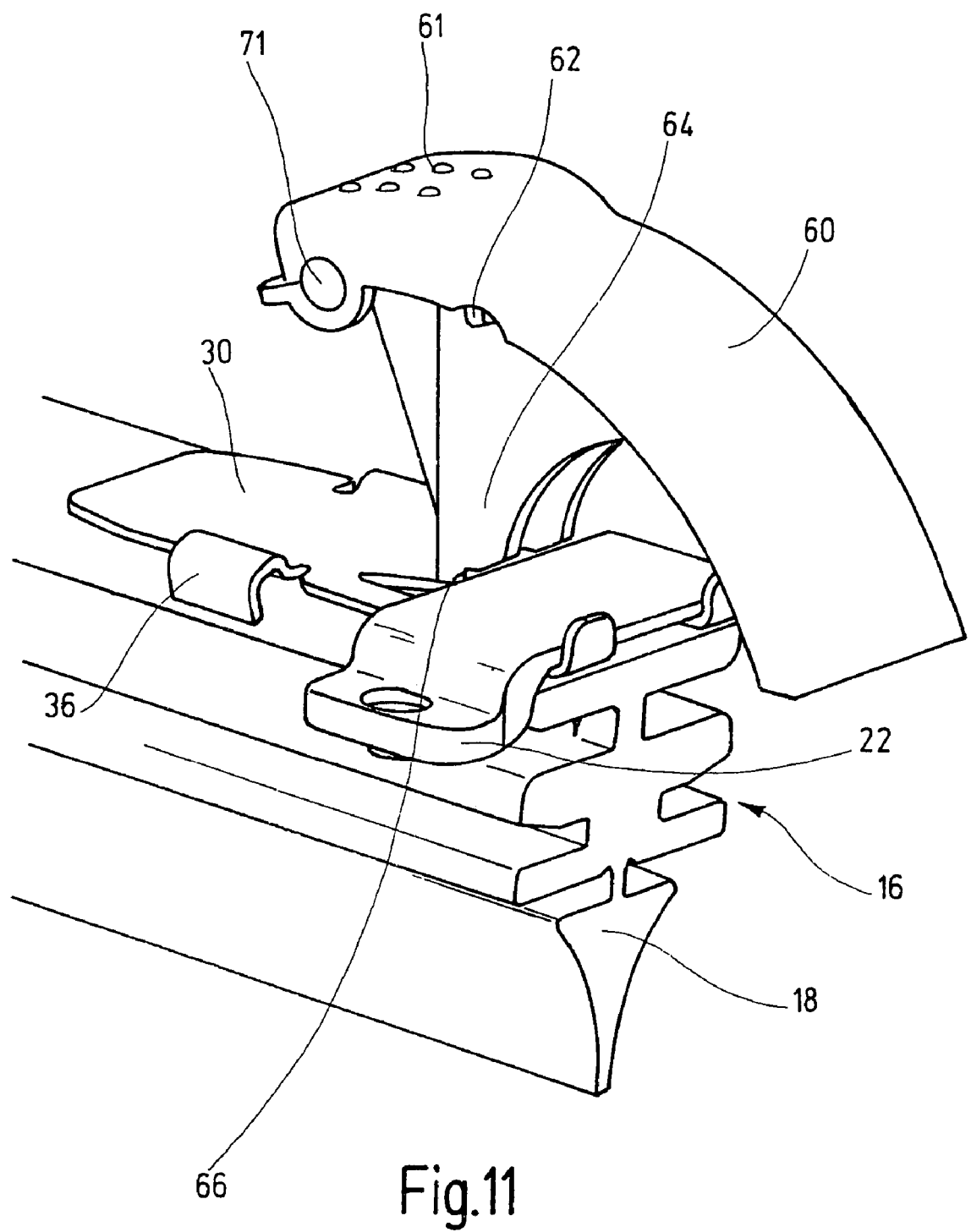
FIG. 11 A perspective detailed view of the cooperation of a securing bow with the fastening clip.
Figure 12:
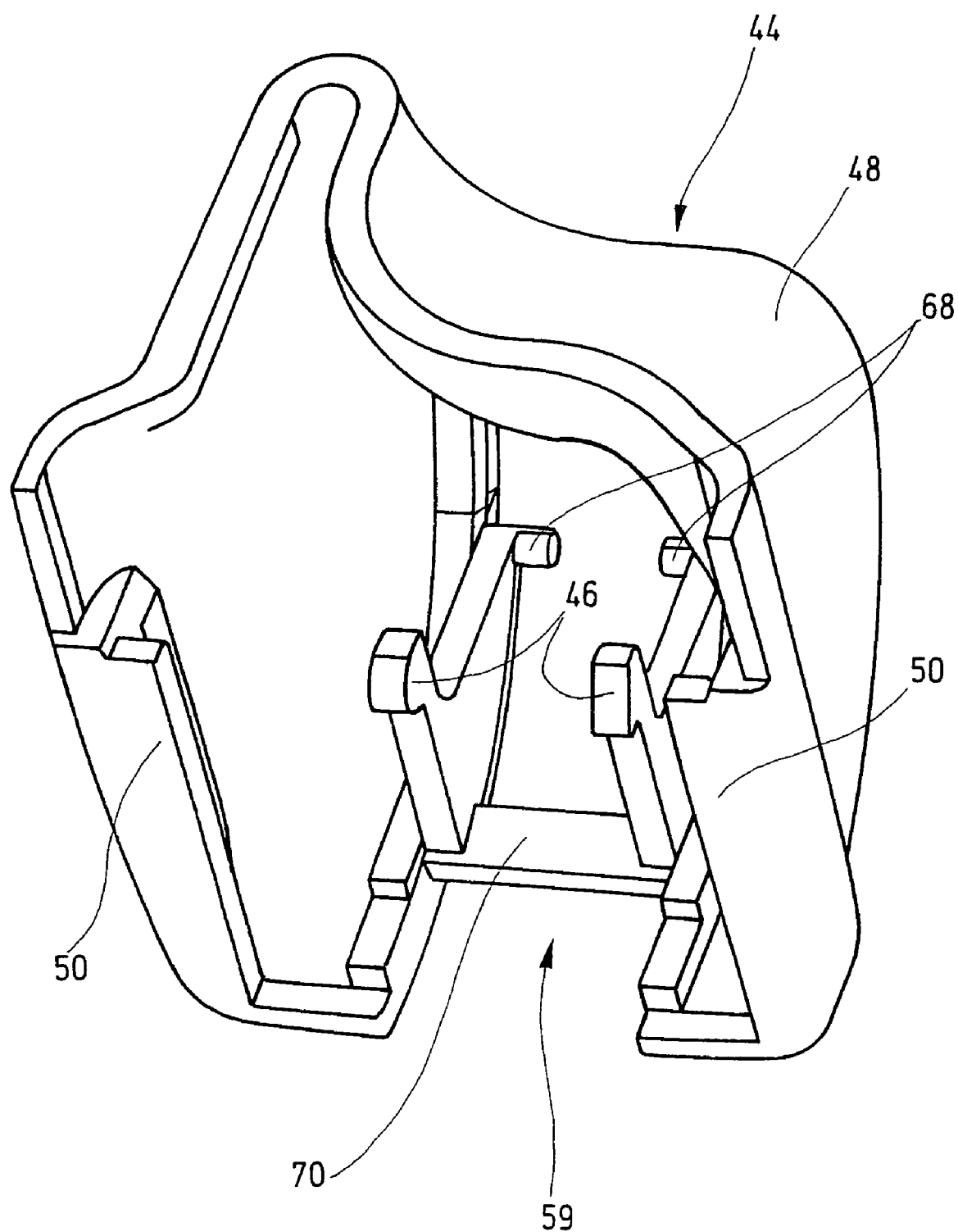
FIG. 12 A perspective view of the cap in accordance with FIG. 9.
Figure 13:
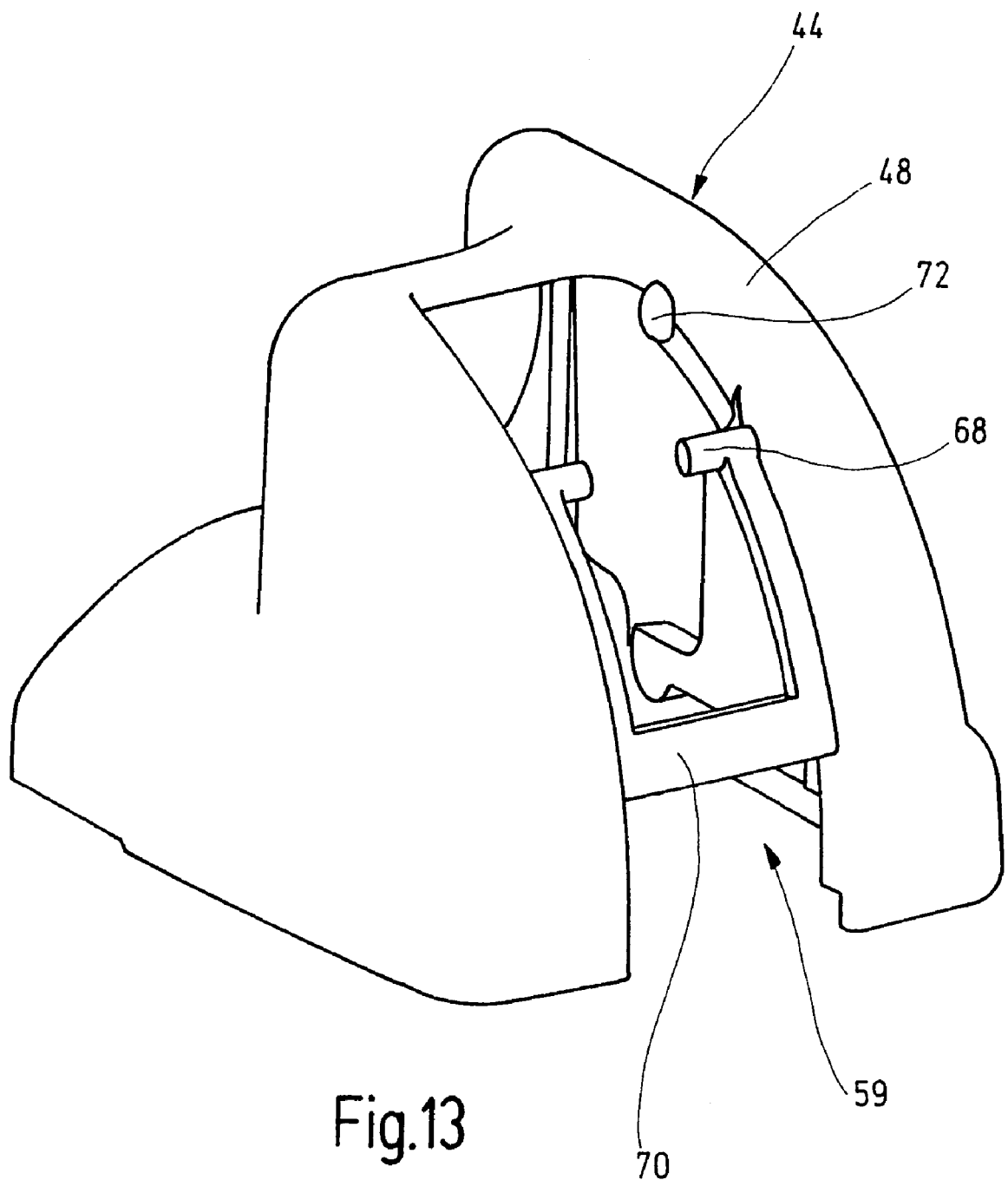
FIG. 13 Another perspective view of the cap in accordance with FIG. 9 with a removed securing bow.

An alternative embodiment of an unlocking device arranged in the cap 44 is illustrated in FIGS. 9 through 13. In this case, the cap 44 features a swivelably positioned securing bow 60, which is adapted in terms of its contour to the curved surface of the cap and can be swiveled in an oblong recess 59 around a limited angle of approx. 25 degrees. Due to pressure on a gripping surface 61 in the upper area of the securing bow 60, this can be moved from a locked setting (FIG. 9) into an unlocked setting (FIGS. 10 and 11).

Below the gripping surface 61, the securing bow 60 laterally features two swivel bearings 62, which are pivoted on swivel pins 68 (see FIGS. 12 and 13) of the cap 44. Locking cavities 71 are provided at the height of the gripping surface 61 into which the corresponding locking projections 72 of the cap 44 engage and are responsible for locking the securing bow 60 in its basic setting. By pressing on the gripping surface 61, the bow 60 is swiveled, wherein a unlocking bow 64 projecting downward at the height of the swivel bearing 62 presses on the spring tongue 42 of the fastening clip 30. A limit stop step 66 on the lower end of the unlocking bow 64 finds a limit stop on the connecting bridge 22, whereby the swivel angle of the securing bow 60 is limited (see FIG. 11).

FIG. 10 shows the fastening clip 30 dipping through under the cap, after it was unlocked by actuating the bow 60. In the case of this alternative variation, the cap 44 remains solidly connected to the spring rails 20 as well as to the spoiler covering 17. To do so, two rigid locking teeth 46 each lying next to the spring tongue 42 in the inner side of the cap 44 grip on the connecting bridge 22 and provide for a solid fit of the cap 44 (see FIG. 12). A bow limit stop 70 on the one hand forms a support for the locked bow 60 and at the same time represents a limit stop for the cap 44 since the bow limit stop 70 is adjacent to the edge of the connecting bridge 22 opposing the locking teeth 46.

FIG. 13 again illustrates the second variation of the cap 44 without the securing bow 60 arranged in the recess 59.

The caps 44 shown can be optionally attached on both ends of the wiper blade 12, wherein, however, only one cap features the described functions. The other cap only serves as a covering and optical sheathing of the end of the wiper blade featuring a connecting bridge.

The invention claimed is:

1. Wiper device for windows of motor vehicles, comprised of a non-articulated wiper blade with a wiper strip, a wiper lip arranged thereon and a coupling part that can be connected to the wiper blade for a detachable connection with a swivelable wiper arm of the vehicle, wherein the wiper strip includes a profile with guide grooves to laterally accommodate two spring rails, which are each connected to one another on their two ends, characterized in that the wiper strip (16) features a locking device, which, in a locked setting, fixes the spring rails (20) in the wiper strip (16), and which, in an unlocked setting, enables a longitudinal displacement of the spring rails (20) in the guide grooves (24) of the wiper strip (16), characterized in that the locking device includes a fastening clip (30) that can be fixed on an upper side (23) of the wiper strip (16), which clip cooperates in a detachable locking connection with a connecting bridge (22) that connects the spring rails (20), characterized in that the fastening clip (30) can be connected to the wiper strip (16) by means of shackles (36) engaging in the guide grooves (24) of the wiper strip (16) and at least one pointed hook (32) that can be pressed into the upper side (23) of a base section (25).

2. Wiper device according to claim 1, characterized in that in a locked setting the fastening clip (30) partially grips under the connecting bridge (22) and is locked against the connecting bridge (22) by means of limit stop hooks (40) and a spring tongue (42).

3. Wiper device according to claim 2, characterized in that the lock can be detached by pressing the elastically deformable spring tongue (42) against the upper side (23) of the base section (25) of the wiper strip (16).

4. Wiper device according to claim 1, characterized in that in a locked setting the fastening clip (30) partially grips under the connecting bridge (22) and is locked against the connecting bridge (22) by means of limit stop hooks (40) and a spring tongue (42).

5. Wiper device for windows of motor vehicles, comprised of a non-articulated wiper blade with a wiper strip, a wiper lip arranged thereon and a coupling part that can be connected to the wiper blade for a detachable connection with a swivelable wiper arm of the vehicle, wherein the wiper strip includes a profile with guide grooves to laterally accommodate two spring rails, which are each connected to one another on their two ends, characterized in that the wiper strip (16) features a locking device, which, in a locked setting, fixes the spring rails (20) in the wiper strip (16), and which, in an unlocked setting, enables a longitudinal displacement of the spring rails (20) in the guide grooves (24) of the wiper strip (16), characterized in that the locking device includes a fastening clip (30) that can be fixed on an upper side (23) of the wiper strip (16), which clip cooperates in a detachable locking connection with a connecting bridge (22) that connects the spring rails (20), characterized in that in a locked setting the fastening clip (30) partially grips under the connecting bridge (22) and is locked against the connecting bridge (22) by means of limit stop hooks (40) and a spring tongue (42), characterized in that the lock can be detached by pressing the elastically deformable spring tongue (42) against the upper side (23) of a base section (25) of the wiper strip (16), characterized in that the lock can be detached by removing a cap (44) from the end of the wiper blade (12).

6. Wiper device according to claim 5, characterized in that the lock can be detached by actuating a securing bow (60) positioned in the cap (44) located at the end of the wiper blade (12).

7. Wiper device according to claim 6, characterized in that the spring tongue (42) can be actuated when swiveling the securing bow (60) via an unlocking bow (64) located on the securing bow.

8. Wiper device according to claim 7, characterized in that the cap (44) is fixed on the connecting bridge (22) by means of at least one essentially rigid locking tooth (46).

9. Wiper device according to claim 7, characterized in that the cap (44) features two slide rails (50) each engaging in the guide grooves (24) of the wiper strip (16).

10. Wiper device according to claim 6, characterized in that the cap (44) is fixed on the connecting bridge (22) by means of at least one essentially rigid locking tooth (46).

11. Wiper device according to claim 10, characterized in that the cap (44) features two slide rails (50) each engaging in the guide grooves (24) of the wiper strip (16).

12. Wiper device according to claim 6, characterized in that the cap (44) features two slide rails (50) each engaging in the guide grooves (24) of the wiper strip (16).

13. Wiper device according to claim 5, characterized in that the cap (44) features two slide rails (50) each engaging in the guide grooves (24) of the wiper strip (16).

14. Wiper device according to claim 5, characterized in that the cap (44) features an elastically deformable locking tooth (46) cooperating with the spring tongue (42), which actuates the spring tongue (42) when the cap (44) is pulled off.

15. Wiper device for windows of motor vehicles, comprised of a non-articulated wiper blade with a wiper strip, a wiper lip arranged thereon and a coupling part that can be connected to the wiper blade for a detachable connection with a swivelable wiper arm of the vehicle, wherein the wiper strip includes a profile with guide grooves to laterally accommodate two spring rails, which are each connected to one another on their two ends, characterized in that the wiper strip (16) features a locking device, which, in a locked setting, fixes the spring rails (20) in the wiper strip (16), and which, in an unlocked setting, enables a longitudinal displacement of the spring rails (20) in the guide grooves (24) of the wiper strip (16), characterized in that the locking device includes a fastening clip (30) that can be fixed on an upper side (23) of the wiper strip (16), which clip cooperates in a detachable locking connection with a connecting bridge (22) that connects the spring rails (20), characterized in that in a locked setting the fastening clip (30) partially grips under the connecting bridge (22) and is locked against the connecting bridge (22) by means of limit stop hooks (40) and a spring tongue (42), characterized in that the lock can be detached by pressing the elastically deformable spring tongue (42) against the upper side (23) of a base section (25) of the wiper strip (16), characterized in that the cap (44) features an elastically deformable locking tooth (46) cooperating with the spring tongue (42), which actuates the spring tongue (42) when the cap (44) is pulled off.

16. Wiper device according to claim 15, characterized in that the cap (44) features two slide rails (50) each engaging in the guide grooves (24) of the wiper strip (16).

* * * * *

UNITED STATES PATENT AND TRADEMARK OFFICE
CERTIFICATE OF CORRECTION

PATENT NO. : 7,581,280 B2  Page 1 of 1
APPLICATION NO. : 10/538948
DATED : September 1, 2009
INVENTOR(S) : Op't Roodt et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1109 days.

Signed and Sealed this

Fourteenth Day of September, 2010

David J. Kappos
*Director of the United States Patent and Trademark Office*